United States Patent [19]

Micek

[11] Patent Number: 4,666,353

[45] Date of Patent: May 19, 1987

[54] ECCENTRICITY ADJUSTMENT DEVICE

[75] Inventor: A. John Micek, St. Paul, Minn.

[73] Assignee: C-Tek Limited Partnership, Minneapolis, Minn.

[21] Appl. No.: 677,870

[22] Filed: Dec. 3, 1984

[51] Int. Cl.$^4$ .............................................. B23B 31/02
[52] U.S. Cl. ..................................... 409/234; 279/1 J; 279/6; 408/153
[58] Field of Search .................... 279/1 J, 6, 83, 2 R; 408/150, 151, 153, 154, 155, 156, 181, 239 R, 239 A; 409/234, 218, 232; 403/282

[56] References Cited

U.S. PATENT DOCUMENTS

| | | | |
|---|---|---|---|
| 2,460,673 | 2/1949 | Berscheid | 403/282 |
| 2,524,485 | 10/1950 | Sloan | 279/119 |
| 2,833,544 | 5/1958 | Blades | 279/6 |
| 2,852,265 | 9/1958 | Van Dinen | 279/66 |
| 3,076,662 | 2/1963 | Kostyrka | 279/4 |
| 3,088,746 | 5/1963 | Highberg et al. | 279/110 |
| 3,484,115 | 12/1969 | Meyer | 279/6 |
| 3,501,983 | 3/1970 | Cassidy et al. | 279/6 |
| 3,603,535 | 12/1971 | Renoux | 279/15 J |
| 3,633,923 | 1/1972 | Morawaki et al. | 279/1 J |
| 3,761,103 | 9/1973 | Zajdel | 279/1 J |
| 4,281,482 | 8/1981 | Rutter | 51/168 |

Primary Examiner—Frank T. Yost
Assistant Examiner—Hien H. Phan
Attorney, Agent, or Firm—Lawrence M. Nawrocki

[57] ABSTRACT

The present invention is a device for adjusting eccentricity of the design axis of rotation of a rotary tool (12) with regard to the axis of rotation of a drive spindle (10). The device includes male and female members (22, 24), one matable to each of the spindle (10) and the tool (12). The male and female members (22, 24) are adjustable relative to each other to vary the eccentricity and to maintain the tool (12) wherein it is not canted relative to the axis of rotation of the spindle (10).

8 Claims, 7 Drawing Figures

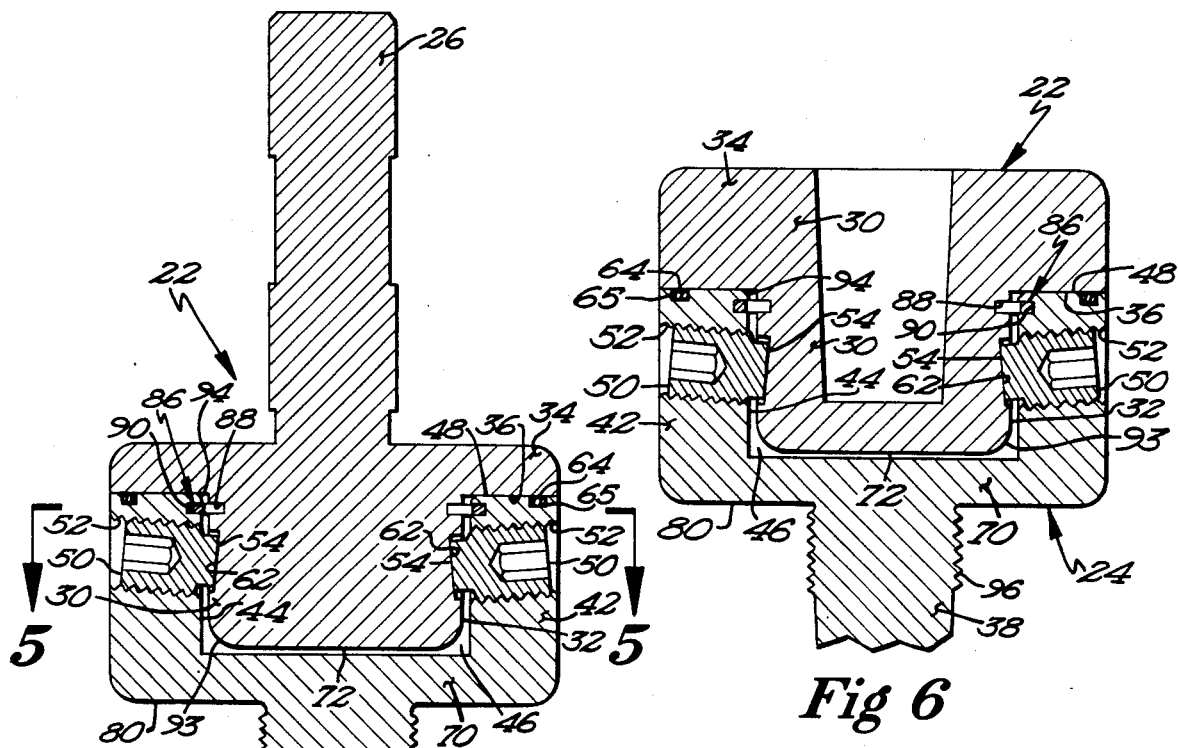
Fig 4
Fig 6
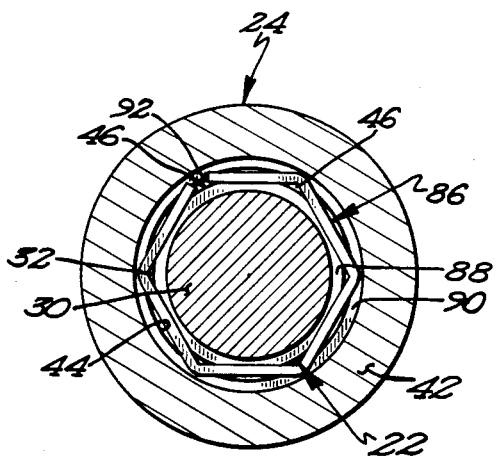
Fig 5
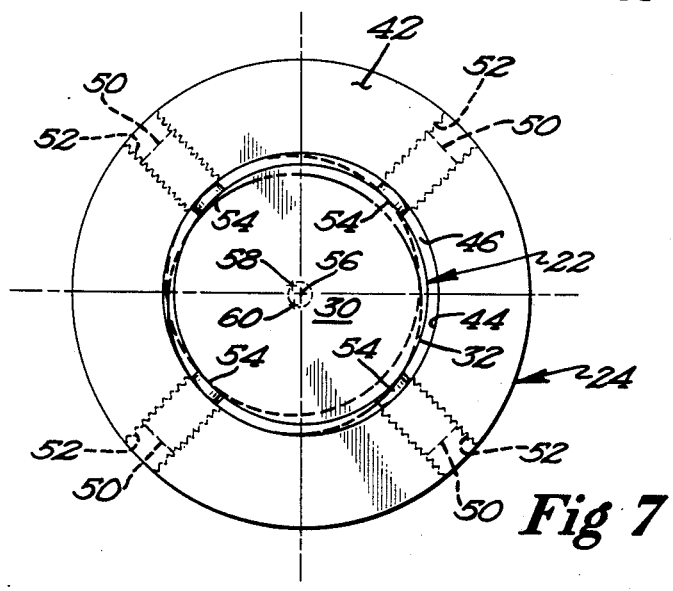
Fig 7

ECCENTRICITY ADJUSTMENT DEVICE

TECHNICAL FIELD

The present invention relates broadly to the field of apparatus for mounting a rotary cutting tool to a rotatably driven spindle to translate the motion of the spindle to the tool. More specifically, the invention relates to apparatus for providing means to adjust the eccentricity of the tool's design axis of rotation relative to the axis of rotation of the spindle. In a preferred embodiment of the invention, this goal is accomplished without introducing any canting of the tool relative to the rotational axis.

BACKGROUND OF THE INVENTION

Various types of rotatably driven cutting tools are known and typically used in performing machining functions. These include twist drills, boring bars, milling cutters, screw thread taps, reamers, etc. Typically, such tools are mounted to the spindle by use of means such as three-jaw chucks or other similar apparatus. Such devices are available commercially and function to translate the rotational motion of the spindle to the tool.

Such chucks serve well to mount a tool particularly when close tolerances are not required. When close tolerances are necessary, however, they frequently prove inefficient for various reasons.

Even with a brand new chuck, an eccentricity of 0.0050 inches can be present between the tool's design axis of rotation and the axis of rotation of the driving spindle. While such eccentricity might be acceptable in some applications, it might prove grossly unacceptable in others.

This problem is further exacerbated by non-uniform wear of grasping surfaces of the jaws after periods of use. Normal wear of the rotatably driven tool grasping chuck surfaces does not proceed uniformally. Thus, axial eccentricity of a rotating cutting tool grasped and driven by the jaws of a chuck typically increases with time of use of the chuck. This is particularly true if the rotating cutting tool should slip within the grasp of the chuck jaws because they are insufficiently tightened to fully resist the torque required by the tool. After a period of time, therefore, even if the gripping jaws were perfectly machined when the chuck was new, the chuck loses its ability to receive and clamp in a precisely centered fashion the driving shank of the tool.

As can be seen, therefore, a central longitudinal axis of a tool such as a twist drill, for example, can easily become spaced at a distance from the axis of rotation of the spindle by which the tool is driven. The tool will, therefore, be made to orbit the spindle's axis of rotation. The hole drilled by such a tool will have a radius equal to the radius of the tool plus the dimension of eccentricity.

Rotary cutting tools are typically provided in certain standard sizes. On occasion, although infrequently, a machinist might be required to make a cut sized between two standard sizes. Rather than being required to obtain a specially constructed tool for this purpose, the cut can be made by rotating the next smaller sized tool eccentrically. That is, the axis of the tool can be displaced from the axis of rotation of the driving spindle by design in order to accomplish the desired cut.

Various structures have been devised to solve these problems in the prior art. For example, U.S. Pat. No. 3,088,746 (Highberg et al) illustrates a RADIALLY ADJUSTABLE CHUCK providing four set screws to forcibly displace the chuck and its grasping jaws assembly to a position at which the axis of the chuck is alligned with the axis of rotation of a driving spindle. Such structures, however, do not ensure that the axis of the tool, once adjusted by the set screws, is a precisely parallel extension of the axis of rotation. While the location of the axis might be adjusted radially, the device of Highberg et al does not provide means for ensuring that the tool's axis does not become canted relative to the rotational axis of the drive spindle. Consequently, rather than solving the problems which the device addresses, the Highberg et al structure can exaggerate them.

The present invention is a device directed to the solving of all of the problems existent in the prior art. It is an improved eccentricity adjustment device which not only adjusts the radial placement of the axis of the tool relative to the spindle's axis of rotation, but it also functions to effect parallelism between the tool's axis and the rotational axis of the spindle.

SUMMARY OF THE INVENTION

The present invention is a device for adjusting the eccentricity of a rotatably driven tool with regard to the axis of rotation of a driving spindle. The device includes a male member having a hub with an outer surface, generally circularly cylindrical with regard to an axis parallel to the axis of rotation of the spindle, and a shoulder at one axial end thereof. Further, the device includes a female member which has an annular wall circumscribing a cavity therewithin. The cavity has a diameter slightly larger than that of the hub of the male member, and the hub can, thereby, be received within the cavity. When the hub is inserted into the cavity, an axial end of the annular wall can engage the shoulder of the male member so that, when the axial end of the female member annular wall is in full engagement with the shoulder, the axis of the male and female members are parallel. Means are provided for concurrently adjusting the relative radial positioning of the male member relative to the female member and urging the distal axial end of the female member into tight engagement with the shoulder of the male member. The parallelism of the axes of the male and female members can, thereby, be ensured. Means are provided for mounting either the male or female member to the spindle for rotation therewith, and the cutting tool to be driven rotatably is attached to the other of the male and female member.

In a preferred embodiment, the outer surface of the hub can be provided with a plurality of circumferentially spaced and aligned generally planar surfaces. Similarly, the annular wall of the female member can be provided with a corresponding number and positioned protuberances which can be disposed for radial reciprocation. The planar surfaces formed in the outer surface of the hub can be angled so that, as the protuberances are urged radially inwardly, engagement of the protuberances with the planar surfaces and movement therealong will deflect the female member axially relative to the male member so that the distal axial end of the female member annular wall is brought into tight engagement with the shoulder of the male member.

It is envisioned that reciprocation of the protuberances would be effected by providing a plurality of apertures in the annular wall of the female member at the desired protuberance locations. Each location could be provided with female threaded surfaces. The outer surfaces of the protuberances would be male threaded, and reciprocation would be effected by selectively turning the protuberances to accomplish desired adjustments.

The protuberances could take the form of dog point set screws which, when screwed radially inwardly, would engage the planar surfaces formed in the hub. If desired, the axis along which a particular set screw would move could be made to be generally perpendicular to the planar surface in the hub with which the set screw would come into engagement.

The present invention envisions incorporating means for retaining the male and female members together in one assembly even when the dog point set screws are withdrawn radially. The hub can be provided, in an outer surface thereof, with an annular groove. Similarly, an inwardly facing surface of the female member annular wall is provided with a groove having an axial dimension similar to that of the groove in the male member hub. When the axial end of the annular wall is in engagement with the shoulder of the male member, at least a portion of the groove in the female member annular wall would be in registration with the groove in the male member hub. An appropriatly sized and shaped snap ring could be fitted into the registered grooves in order to accomplish the goal of maintaining the male and female members together in a unitary assembly even when the set screws are withdrawn radially. It will be noted that the axial dimension of the snap ring would be smaller then the axial dimension of at least one of the grooves so that relative axial movement of the male and female members will be permitted in order to permit the urging of the distal axial end of the female member into tight engagement with the shoulder of the male member.

Alternatively, the hub can be provided, in an axial end opposite that at which is positioned the shoulder, with a deformable annular lip. As the hub would be inserted into the cavity in the female member, the lip would be brought into engagement with a base of the cavity. The lip could be provided with a convex surface to engage the base so that, as force would be exerted upon the hub, the convex surface would function as a rolling fulcrum to divert the lip radially outwardly and into an annular groove formed in the inner surface of the female member wall proximate the base thereof. Once the lip was deformed into this groove, the two members would be maintained as an assembly. The axial dimension of the groove would, of course, be slightly larger than the axial dimension of the lip in order to permit relative axial movement of the members so that the distal end of the female member wall could be brought into tight engagement with the male member shoulder.

The present invention is, thus, an improved eccentricity adjustment device. More specific features and advantages obtained in view of those features will become apparent with reference to the DETAILED DESCRIPTION OF THE INVENTION portion of this document, the accompanying claims, and the appended drawing figures.

BRIEF DESCRIPTION OF THE DRAWINGS

FIG. 4 illustrates, in a sectional view, an alternative embodiment for securing the male and female members into one assembly utilizing a hexagonal snap ring;

FIG. 5 is a view taken generally along the line 5—5 of FIG. 4;

FIG. 6 is a sectional view illustrating a different method by which the male member can be mated to the drive spindle;

FIG. 7 is a diagrammatic view showing relative radial adjustment positioning of the female member relative to the male member.

DETAILED DESCRIPTION OF THE INVENTION

Figure 1:
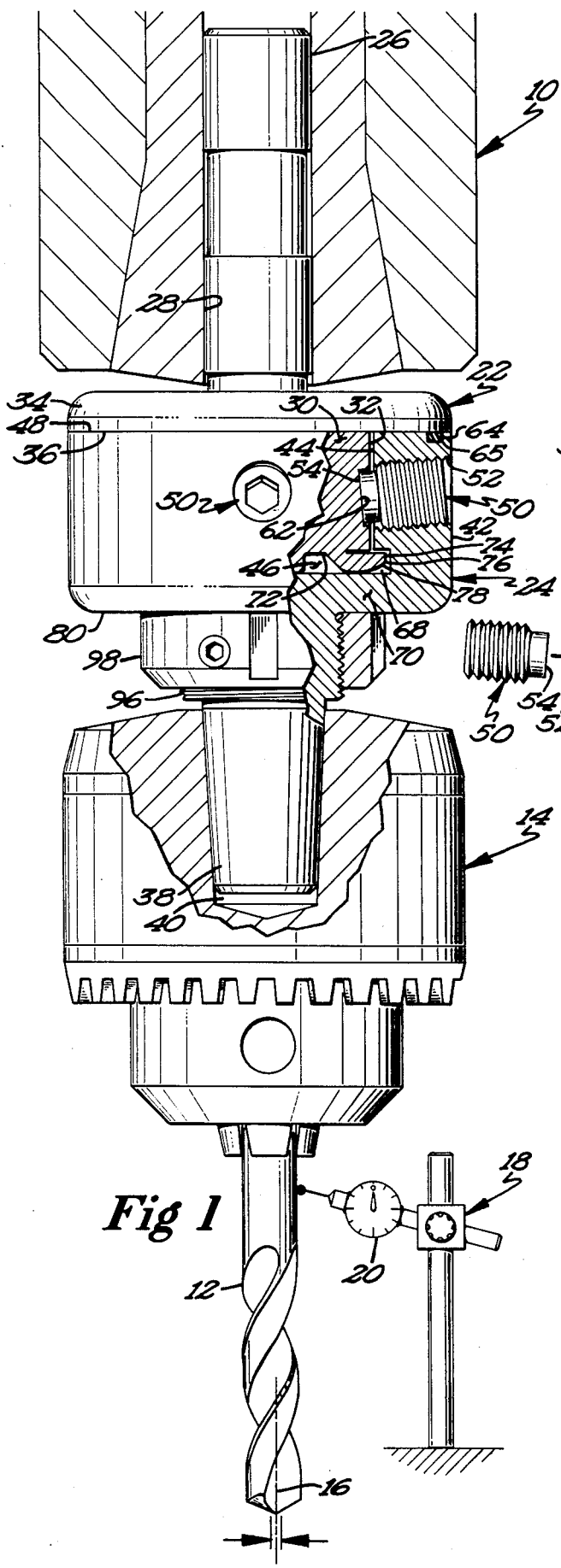
FIG. 1 is a side elevational view of the present invention and a typical three jaw chuck mounted to the female member thereof, some portions being broken away, in combination with a driving spindle, a tool, and a dial indicator and axial displacement measuring device.

Referring now to the drawings wherein like reference numerals denote like elements throughout the several views, FIG. 1 illustrates a preferred embodiment of the present invention in combination with a rotatably driven spindle 10, a twist drill bit 12 (illustrative of various tools with which the invention can be used), and a typical three-jaw chuck 14 mounting the bit 12. The chuck 14 is one of a type known in the art and presently commercially available.

The drive spindle 10 is made to rotate about an axis (not shown in the figures). The present invention functions to either reduce or increase the eccentricity of a central longitudinal axis 16 of the tool 12 with respect to the axis about which the spindle 10 is driven. If it is desired that the axis 16 of the tool 12 be aligned with the axis of rotation of the spindle 10, adjustments are made by use of the present invention in a manner as will be seen hereinafter in order to reduce the eccentricity to zero. If, on the other hand, for example using a twist drill, it is desired to bore a hole slightly larger than one which could be made using a standard size drill, the axis 16 of the tool 12 could be offset so that the sum of the radius of the tool 12 and the eccentricity provided would total the desired radius of the hole to be bored. Eccentricity can be ascertained in any appropriate manner. FIG. 1 illustrates an axis offset measuring device 18 having a dial indicator 20 by which eccentricity can be measured. It will be understood, however, that any appropriate means for measuring eccenrtricity can be employed.

Figure 2:
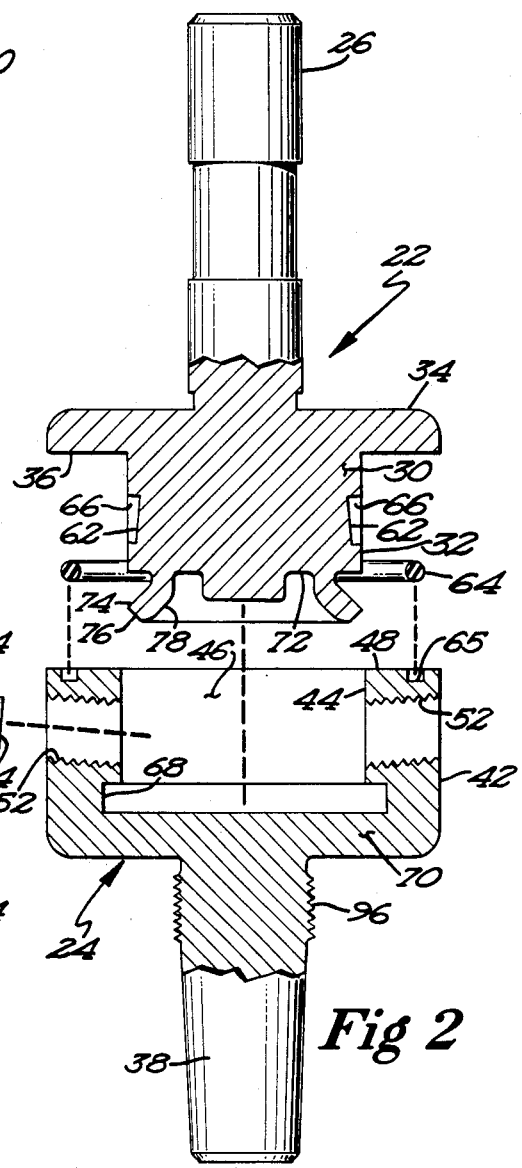
FIG. 2 is an exploded elevational view of the preferred embodiment of the invention showing all components before assembly, some portions being broken away.

Referring now to FIG. 2, the present invention includes a male member 22 and a female member 24. The male member 22, as illustrated in the figures, is matable to the drive spindle 10. As will become more apparent with reference to disclosure made hereinafter, however, the female member 24 could, equally as well, be designed to be mated to the drive spindle 10.

Mating of the male member 22 to the spindle 10 can be accomplished in a number of ways. FIG. 2 illustrates a shank 26 which can be fitted into an aperture 28 in the spindle 10 and be secured there by appropriate means. Securing can be effectuated by providing a locking taper fit between the shank 26 and an inner surface of the aperture 28 in the spindle 10, by collet chuck, or by other appropriate means. FIG. 6 illustrates an alternative securing means. Because of the high frictional torque characteristics of "self-holding" tapers used, it may not be necessary to provide splines and keyways in order to insure that rotational motion of the spindle 10 is translated to the male member 22, but splining can be provided, if desired.

The male member 22 further includes a hub portion extending downwardly from the shank 26. As seen in the figures, the hub 30 has an outer surface 32 which demarks the diameter of the hub 30. The male member 22 is provided with a flange-like portion 34 intermediate the shank 26 and the hub 30. While the hub 30 is shown as having a diameter larger than that of the shank 26, the flange-like portion 34 extends radially even beyond the outer surface 32 of the hub 30 in order to define a shoulder 36.

FIG. 1 illustrates the female member 24 as having a tapered shank 38 extending in an axial direction and receivable within a correspondingly tapered aperture 40 in the typical three-jaw chuck 14. As in the case of the shank 26 of the male member and its mating to the drive spindle 10, any appropriate means for securing the female member shank 38 and the chuck 14 together in order to effect translation of rotational motion can be utilized.

The female member 24 has, extending upwardly from the shank portion 38 as seen in FIG. 2, an annular wall 42 with an inner surface 44 circumscribing a cavity 46 within the wall 42. The diameter of the cavity 46 is larger than that of the hub portion 30 of the male member so that the hub 30 can be received within the cavity 46. The invention provides for diametral clearance spacing between the outer surface 32 of the hub 30 and the inner surface 44 of the female member wall 42 so that the male member 22 and female member 24 can be adjusted laterally relative to one another. As can be seen, then, by adjusting the female member 24 relative to the male member 22, the longitudinal axis 16 of the tool 12 can be moved relative to the axis about which the drive spindle 10 rotates in order to adjust eccentricity.

FIG. 7 illustrates how this lateral adjustment of the male member 22 relative to the female member 24 can be effectuated. That figure shows four dog point set screws 50 passing radially through the annular wall 42 so that inner ends 54 enter into the cavity 46 to impinge upon the hub portion 30 of the male member 22. With the set screws 50 in their positions as indicated in FIG. 7, hub 30 is generally concentric with the annular wall 42, and their centers generally coincide at index 56. If the set screw 50 approaching center from the upper left quadrant, as viewed in FIG. 7, is withdrawn and the set screw approaching center from the lower right quadrant, as viewed in FIG. 7, is moved radially inwardly, hub 30 will become offset so that its center is displaced to index 58. Similarly, if the set screw 50 approaching center from the lower left quadrant, as viewed in FIG. 7, is withdrawn and the set screw 50 approaching center from the upper right quadrant, as viewed in FIG. 7, is moved radially inwardly, hub 30 will be displaced to index 60. Various combinations of adjustments can be made to position the hub 30 relative to the annular wall 42 so that a desired eccentricity is achieved.

The invention employs the set screws 50 for adjusting the male and female members 22, 24 relative to one another and concurrently urging an axial end 48 of the female member wall 42, distal with respect to the three-jaw chuck 14, toward the flange portion 34 carried by the male member 22 and into tight engagement therewith. The shoulder 36 formed by the flange portion 34 of the male member 22 defines a plane which is substantially normal to a central axis of the male member 22, and the distal end 48 of the female member wall 42, similarly, defines a plane generally normal to the axis of the female member 24. Consequently, by bringing the axial end 48 of the female member 24 into tight engagement with the male member shoulder 36, the axes of the male and female members 22, 24 are made to be substantially parallel. By so doing, the axis 16 of the tool 12 will be made to be substantially parallel to the axis about which the spindle 10 is driven. Consequently, canting of the tool 12 will be precluded.

The male member hub outer surface 32 is provided with a plurality of faceted surfaces 62 corresponding in number and location to the dog point set screws 50 carried by the female member 24. When the hub 30 is received within the cavity 46 defined by the female member wall 42, the faceted surfaces 62 on the hub outer surface 32 can be brought into registration with the locations of the set screws 50. By adjusting the set screws 50 radially inwardly toward the hub 30, the inner ends 54 of the screws 50 impinge upon the faceted surfaces 62.

Typically, the faceted surfaces 62 would be planar and, in the preferred embodiment, would be at an angle of approximately 5 degrees to an axis of the male member 22 with respect to which the outer surface 32 of the hub portion 30 is circularly cylindrical. The surfaces 62 would angle toward the axis as they approach the flange portion of the member 22.

As the set screws 50 are rotated to move radially inwardly, the inner ends 54 of the screws 50 will engage their corresponding faceted surfaces 62. As the set screws 50 are rotated additional amounts to move them inwardly, the inner ends 54 of the screws 50 will tend to seek out that portion of the faceted surface 62 which is deepest with respect to the inward movement of the screw 50. Because of the structuring and angling of the faceted surfaces 62, these "deepest" locations will be at extremities of the faceted surfaces 62 closest to the flange portion 34. As a result, as the set screws 50 move radially inwardly, they will be deflected toward the flange portion 34 and, concurrently, "drag" the female portion 34 in that direction. The axial locations of the apertures 52 through which the dog point set screws 50 reciprocate and the faceted surfaces 62 are such that the distal axial end 48 of the female member wall 42 will, in fact, engage the shoulder 36 defined by the flange portion 34 and be able to be urged tightly into engagement with the shoulder 36.

As will be appreciated, movement of the set screws 50 can be along a perfectly radially extending path, since the engagement of the faceted surfaces 62 by the ends 54 of the set screws 50 will effect the axial movement of the female number 24 relative to the the male member 22 irrespective of the angle of attack of the set screws 50 against the faceted surfaces 62. It is deemed to be optimum, however, if the set screws 50 are reciprocable along paths normal to their respective corresponding faceted surfaces 62. The set screws 50, as seen in the figures, therefore, reciprocate along paths at an angle of 85 degrees relative to the axis with respect to which the inner surface 44 of the female member wall 42 is circularly cylindrical.

The inner end 54 of each set screw 50 can be provided with a generally planar surface for engaging its corresponding faceted surface 62. Such a planar surface can be substantially perpendicular to the axis along which the set screw 50 reciprocates. With the axis of reciprocation generally perpendicular to the planar faceted surface 62, the planar surface of the corresponding set screw 50 will be parallel thereto. When the inner ends 54 of the set screws 50 are brought into engagement with the faceted surfaces 62, therefore, a "wrench" effect will be created so that rotation of the male member 22 will be translated to the female member 24.

Because an assembly comprising the male and female members 22, 24 is subjected to significant vibration during the operation of the particular machine, nylon pads (not shown) can be applied to the threads of the set screws 50 in order to be able to adjust the screws 50 and rely upon their being maintained in the desired position. With the screws thus maintainable, indicia (not shown) can be provided on the outer surface of the female member wall 42 in order to be able to determine the radial positioning of the screws 50 and, consequently, the eccentricity being provided.

As seen in the figures, the faceted surfaces 62 formed in the outer surface 32 of the hub portion 30 of the male member 22 are recessed to receive the dog point set screws 50. By so structuring the male member 22, a machine operator need not rely upon merely the "wrench" effect created by engagement of the planar sufaces at the ends 54 of the set screws 50 with the faceted surfaces 62 to insure safe translation of rotational motion from the male member 22 to the female member 24. With the faceted surfaces 62 being recessed, side walls 66 of the recesses can engage side walls of the set screws 50 to achieve a splining effect. As a result, even if set screws 50 should become withdrawn somewhat, translation of rotational motion to the female member 24 will still be insured.

Means are provided to prevent the entry of metal chips between the axial end 48 of the female member wall 42 and the shoulder 36 defined by the flange portion 34 of the male member 22 in order to preclude scoring of the various internal surfaces. This is accomplished by placement and receipt of a resilient O-ring seal 64, resistent to oil and machining coolant, within an annular channel 65 formed in the distal axial end 48 of the female member wall 42.

As will be perceived, as the dog point set screws 50 are withdrawn radially outwardly so that they do not extend inwardly beyond the inner surface 44 of the female member wall 42, the male and female members 22, 24 would be free to diverge from one another and separate. Although these members are, of course, manufactured separately,, it is desirable that, once they are used in combination, they would be maintained together in a unitary assembly. By being so maintained, the chances are less likely of misplacing one of the members, and the seal between the distal axial end of the female member wall 42 and the shoulder 36 of the male member flange 34 can be maintained in place.

FIGS. 4, 5, and 6 illustrate the use of a snap ring 86 for maintaining the male and female members 22, 24 in an assembly. As seen in FIGS. 4 and 6, registered annual grooves 88, 90 can be formed in the outer surface 32 of the hub 30 and the inner surface 44 of the female member wall 42, respectively. An appropriately sized and shaped snap ring 86 can be positioned in the groove 90 in the wall 42 of the female member 24, and the hub 30 can then be urged into the cavity 46 in the female member 24. Because of resiliency afforded to the snap ring 86 and the discontinuity 92 therein at a location about its perimeter, the ring can be deformed outwardly in groove 90 as the hub 30 enters cavity 46. As the groove 88 achieves the axial location of the ring 86 received in groove 90 in the female member wall 42, it will snap inwardly into groove 88. To facilitate camming of ring 86 outward into groove 90, hub 30 can be radiused as at 93. The male and female members 22, 24 will then be held together in assembly.

In order to facilitate the inward deformation of the ring 86 to allow it to be positioned in groove 90, the entrance to the cavity 46 can be provided with annular beveling 94. By so structuring the entrance to the cavity 46, "camming" action will occur to urge the ring 86 inwardly.

As seen in FIG. 5, a generally hexagonally shaped snap ring 86 is contemplated as being used in this embodiment. It will be understood, however, that snap rings configured in other fashions will also serve to accomplish the intended function.

As seen in FIGS. 4 and 6, the groove 90 formed in the female member wall 42 has an axial dimension greater then does the groove 88 formed in the hub 30. While the snap ring 86 may be dimensioned closely to the axial dimension of the groove 88, the larger axial dimension of the groove 90 will afford some measure of relative axial movement between the male and female members 22, 24. As a result, the urging of the axial end 48 of the female member 24 into tight engagement with the shoulder 36 defined by the flange portion 34 of the male member 22 will not be precluded.

Figure 3:
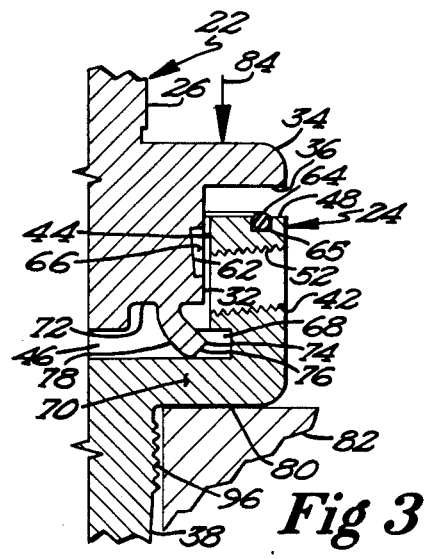
FIG. 3 is a partial sectional view of the preferred embodiment showing an assembly jig holding the female component and illustrating force being applied to the male member during assembly.

FIGS. 2 and 3 illustrate an alternative embodiment of the mating means. The inner surface 44 of the female member wall 42 can be provided, at an axial end of the cavity 46 opposite the end from which the male member hub 30 enters the cavity 46, with an annular groove 68. This grove 68 would be proximate a base portion 70 of the female member 24.

A bottom surface 72 of the male member hub 30 can carry a deformable lip 74 annular in structure. The lip 74 extends downwardly and outwardly from the location on the hub 30 from which it exits. Prior to the hub 30 being inserted into the cavity 46, the extremity 76 of the lip 74 would be within an imaginary cylinder extending from the hub 30 so that the lip 74 would not preclude insertion of the hub 30 into the cavity 46.

The downward and inwardly facing surface of the lip 74 is illustrated as being convex as at 78 and would, optimally, be provided with a substantially constant radius of curvature. As the hub portion 30 of the male member 22 is inserted into the cavity 46, this convex surface 78 would be first to engage the base portion 70 of the female member 24 and would function as a "rolling fulcrum" on which the lip 74 would turn in deforming outwardly into the annular groove formed in the inner surface 44 of the female member wall 42.

FIG. 3 illustrates a manner in which the male member 22 could be married to the female member 24. An under surface 80 of the base portion 70 of the female member 24 could be seated on a jig 82 specially provided to receive the female member 24. With the female member 24 so seated, the male member 22 could be made to approach the female member 24 and the hub 30 enter the cavity 46 formed within the wall 42 of the female member 24. As pressure is applied downward as indicated by the arrow 84, the convex surface 78 of the lip 74 could function as the "rolling fulcrum" previously described, and the lip 74 would deform radially outwardly into the groove 68. With the lip 74 so deformed, the male and female portions 22, 24 would be retained together as a unitary assembly.

As seen in FIG. 1, the axial dimension of the groove 68 would be greater than the axial dimension of the lip 74 as measured once the lip 74 is deformed and received within the groove 68. As a result, even though the male and female members 22, 24 are integrated into a unitary assembly, some relative axial movement of the male member relative to the female member 22 is permitted. Consequently, the urging of the distal axial end 48 of the female member 24 into tight engagement with the shoulder 36 defined by the flange portion 34 of the male member 22 will not be precluded.

Each of FIGS. 1, 2, 4, and 6 illustrate a series of threads 96 formed in the upper extremity of the downwardly extending shank 38 which is to be mated with the three-jaw chuck 14. FIG. 1 illustrates a collar threaded onto this structure. Such a collar can be used to facilitate removal of the chuck from the female member 24 when, for example, the user of the implement desires to change the tool 12. By rotating the collar 98 so that the threads 96 urge it downwardly, the collar 98 is brought to bear upon the upper end of the chuck 14, and as the collar 98 is continued to be rotated to move it downwardly, mechanical advantage will be obtained to push the chuck 14 out of engagement with the female member 24.

The present invention can be made from one of various materials suited to applications of the particular type of device. It may be constructed of many carbon or alloy steels, depending upon the strength and resistence to damage required in actual practice. It has been found that SAE 1117 leaded, free machining steel, surface hardened by carbonizing or nitriding by treatment by the Kolene Corporation Melanite ® QPQ process is a preferred material.

Numerous characteristics and advantages of the invention for which this application has been submitted have been set forth in the foregoing description. It will be understood, however, that this disclosure is, in many respects, only illustrative. Changes may be made in details, particularly in matters of shape, size, choice of material, and arrangement of parts without exceeding the scope of the invention. The invention's scope is, of course, defined in the language in which the appended claims are expressed.

What is claimed is:

1. In combination with a spindle rotatably driven about an axis of rotation and a tool to which rotation of the spindle is to be translated; a device for regulating eccentricity of the tool's design axis of rotation relative to the axis of rotation of the spindle, comprising:
   (a) a male member securable to the spindle, said male member including,
      (i) means connectable to the spindle to effect transmission of rotation of the spindle to said male member;
      (ii) a hub extending axially from said transmission means and having an outer surface, substantially circularly cylindrical with respect to the axis of rotation of the spindle when said male member is secured to the spindle;
      (iii) a flange axially intermediate said transmission means and said hub, said flange defining a shoulder proximate said hub which extends radially beyond said hub and is, when said male member is secured to the spindle, substantially perpendicular to the axis of rotation of the spindle; and
      (iv) an annular lip, deformable under increased pressure, carried by said hub proximate an end thereof remote from said shoulder, said lip having a convex surface;
   (b) a female member including,
      (i) an annular wall having a distal axial end, said wall being sized to receive said hub therewithin and allow relative eccentric movement of said wall relative to said hub, said wall having an inner surface circumscribing a cavity into which said hub is received and an annular groove, sized to receive said lip therein, formed in said inner surface proximate a base of said female member closing an end of said wall opposite said distal end thereof; and
      (ii) means carried by said annular wall for mounting the tool substantially concentric therewith; and
   (c) means for simultaneously adjusting the eccentricity of said annular wall relative to said hub and urging said distal end of said wall into tight engagement with said shoulder;
   (d) wherein, as said hub is inserted into said cavity, said lip engaged with said base of said female member, and pressure applied thereto, said lip deforms radially outwardly into said annular groove formed in said inner surface of said female member wall.

2. The combination of claim 1 wherein said convex surface of said lip has a substantially constant radius of curvature.

3. The combination of claim 1 wherein said convex surface comprises a rolling fulcrum on which said lip deforms outward into said annular groove in said inner surface of said female member wall.

4. The combination of claim 1 wherein said lip, when received within said annular groove formed in said inner surface of said female member wall, has an axial dimension smaller than that of said groove, wherein a measure of axial movement of said male member relative to said female member is permitted.

5. In combination with a spindle rotatably driven about an axis of rotation, and a tool to which rotation of the spindle is to be translated; a device for regulating eccentricity of the tool's design axis of rotation relative to the axis of rotation of the spindle, comprising:
   (a) a male member securable to the spindle, said male member including,
      (i) means connectable to the spindle to effect transmission of rotation of the spindle to said male member;
      (ii) a hub extending axially from said transmission means and having an outer surface, substantially cylindrical with respect to the axis of rotation of the spindle when said male member is secured to the spindle;
      (iii) a flange axially intermediate said transmission means and said hub, said flange defining a shoulder proximate said hub which extends radially beyond said hub and is, when said male member is secured to the spindle, substantially perpendicular to the axis of rotation of the spindle; and (iv) an annular lip, deformable under increased pressure, carried by said hub at a location thereon spaced axially from said shoulder, said lip having a convex surface;

(b) a female member including, (i) an annular wall having a distal axial end, said wall being sized to receive said hub therewithin and allow relative eccentric movement of said wall relative to said hub, said wall having an inner surface circumscribing a cavity into which said hub is inserted and an annular groove, sized to receive said lip therein, formed in said inner surface at an axial location therealong substantially the same distance from said distal axial end as that at which said lip is from said shoulder, said annual groove having a shoulder engageable by said convex surface of said lip as said hub is inserted into said cavity; and (ii) means carried by said annular wall for mounting the tool substantially concentric therewith; and (c) means for simultaneously adjusting the eccentricity of said annular wall relative to said hub and urging said distal end of said wall into tight engagement with said shoulder;

(d) wherein, as said hub is inserted into said cavity, said convex surface of said lip engages said shoulder of said annular groove, and, as pressure is applied thereto, said lip deforms radially outwardly into said annular groove.

6. The combination of claim 5 wherein said convex surface of said lip has a substantially constant radius of curvature.

7. The combination of claim 5 wherein said convex surface comprises a rolling fulcrum on which said lip deforms outward into said annular groove in said inner surface of said female member wall.

8. The combination of claim 5 wherein said lip, when received within said annular groove formed in said inner surface of said female member wall, has an axial dimension smaller than that of said groove, wherein a measure of axial movement of said male member relative to said female member is permitted.

* * * * *